United States Patent Office 3,422,940
Patented Jan. 21, 1969

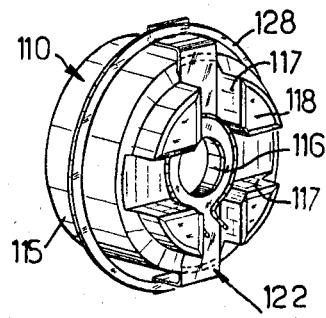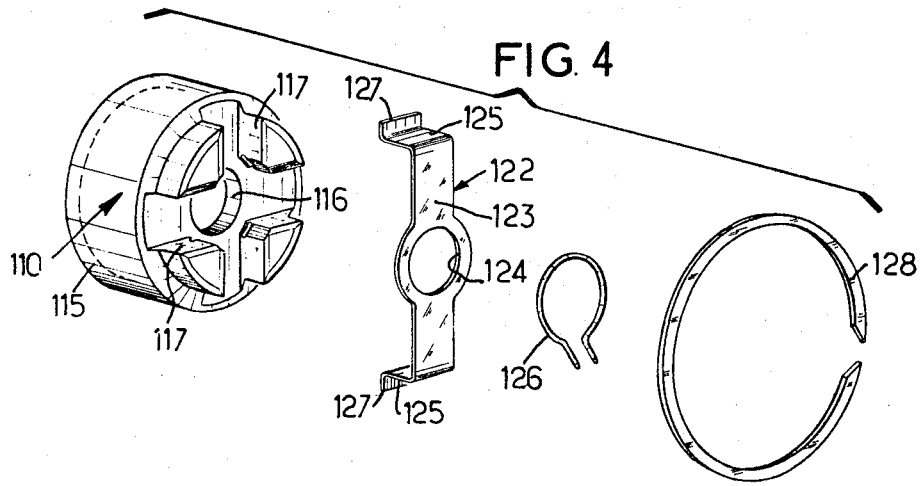

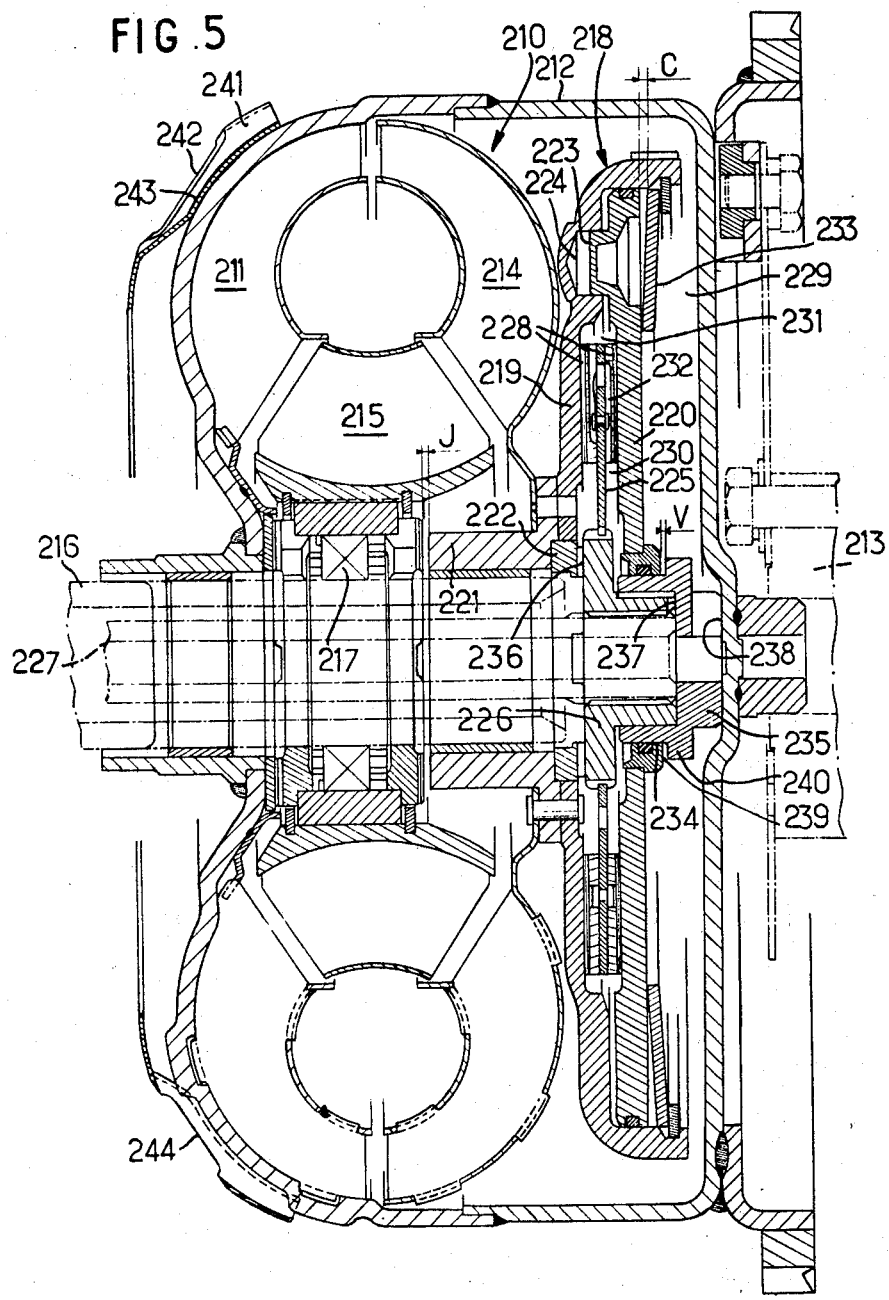

3,422,940
HYDRAULIC TRANSMISSION SYSTEMS
Jean Maurice, Paris, France, assignor to Societe Anonyme Francaise du Ferodo, Paris, France, a corporation of France
Filed May 29, 1967, Ser. No. 641,891
U.S. Cl. 192—3.33                          12 Claims
Int. Cl. F16d 37/00

ABSTRACT OF THE DISCLOSURE

Hydraulic transmissions having, in a same bell casing filled with oil, a hydraulic coupling apparatus (torque converter or hydraulic turbo-coupling) and a clutch. The driven shaft is freely axially mounted and is applied, by means of a spring acting on one of its ends, against the bell-housing at its other end through a sealing collar.

---

The present invention relates to hydraulic transmission systems, particularly for automobile vehicles, and of the kind having a rotatable bell casing filled with oil and connected to a driving shaft for rotation therewith, a hydraulic coupling device (torque converter or hydraulic turbo-coupling) having an impeller fixed to the bell casing, a turbine adapted to be driven in rotation by the impeller under the action of the oil, and two clutch plates in piston/cylinder relationship coupled for rotation with the turbine and adapted to grip or release a friction disc coupled for rotation with a driven shaft, the bell casing being divided into two oil chambers of which one is outside and the outer within the two plates, in combination with a source of oil under pressure, as, for example, an oil pump, circulation ducts for the oil, and distribution means sensitive to the operating conditions of a control device, such as a gear box or reversing device, and selectively directing the oil under pressure towards one or the other of the chambers for engaging or disengaging the clutch.

The present invention has for an object to provide a hydraulic transmission of the aforesaid kind characterised particularly in that, the driven shaft, having an axial passage forming part of one of the ducts, and being fast for rotation with and axially free, at one of its ends, from the input shaft of a gearbox, and at its other end from a carrying hub of the friction disc, is urged, at its end adjacent the gearbox by elastic means which maintain it applied in sealed manner against a sealing collar bearing on the transverse wall of the bell casing, the collar having at least one passage for communicating with the axial passage of the driven shaft and the oil chamber at the exterior of the clutch plates, and having also a cylindrical skirt inserted between the friction disc carrying hub, and an annular bearing rigid with the piston plate of the clutch in the central zone of the latter, sealing means being interposed between the annular bearing and the skirt and the sealing collar being preferably prevented from turning with respect to the bearing.

This arrangement provides, at the level of the sleeve, an excellent sealing between the two oil chambers, and, since the collar is prevented from turning with respect to its associated clutch plate, a simple toroidal joint may be used as the sealing means, the latter thus being driven not in rotation but simply in translation. This is obtained either by a frictional engagement of the sealing collar in the annular bearing which carries the joint, or by an open ended rectangular member which is inserted at its base into a diametric groove of the sealing collar, and by its lateral arms into notches rigid with the bearing.

In accordance with another aspect of the invention, the driven shaft being centered at its two ends and being surrounded by a fixed sleeve, a simple collar carrying sealing segments is interposed between the fixed sleeve and the driven shaft.

This arrangement enables a better axial sliding of the driven shaft to take place, and consequently a better sealing application of the end of the shaft against the associated sealing collar.

In another embodiment of the invention, axial abutment means are interposed between the piston plate of the clutch and the rotatable bell casing, such abutment means providing between the clutch plates in the engaged position of the clutch, an axial gap, which is less than the relative movement of the plates required to cause declutching, between the clutch plates, but which is greater than the said movement minus the play left during assembly between the turbine and impeller.

From this arrangement, stems the advantage that the friction disc is relieved of all axial stress at the moment of declutching, and this eliminates all spurious frictional drag; the axial displacement of the plates one with respect to the other to produce the declutching effect is divided, in practice, into a first part which is effected by one of the plates in one direction with respect to the impeller and a second part effected by the other plate in the other direction with respect to the impeller.

In a preferred embodiment, the axial abutment means is arranged on the sealing collar, and more specifically on a flange of the collar.

The characteristics and advantages of the invention will more fully appear from the following description given by way of example with reference to the accompanying drawings in which:

FIG. 3 is a perspective view of one of the operative elements of the transmission;

FIG. 4 is an exploded perspective view of the device shown assembled in FIG. 3; and FIG. 5 is a partial view similar to FIGS. 1 and 2 and concerns an alternative embodiment.

Figure 1:
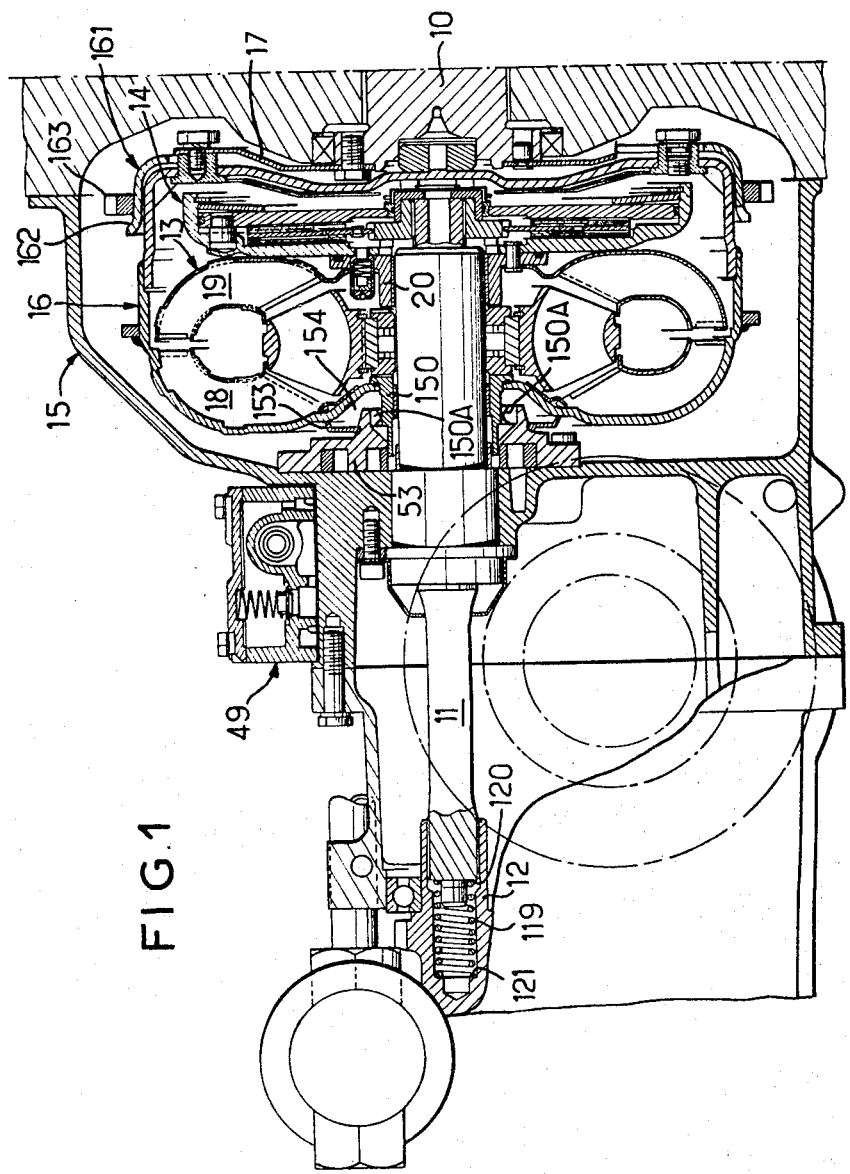
FIG. 1 is a view of a hydraulic transmission of the invention in longitudinal section along the line I—I of FIG. 2, certain of the ducts having been omitted.

Referring to the embodiment shown in FIGS. 1 to 4 which is an application of the invention to the hydraulic transmission of an automobile vehicle, FIG. 1 shows, at 10, the driving shaft of the transmission and at 11 the driven shaft which is engaged on the splines of the primary shaft 12 of a gearbox and/or an inversion device (not shown) which couples the shaft 12 to the shaft 11.

The transmission comprises a hydraulic coupling device 13, disengageable by a clutch 14. The device 13 is shown in the form of a hydraulic torque converter but can equally well be a hydraulic turbo-coupling.

A fixed outer housing 15 is located between the housings of the engine and gearbox. Within this housing 15 is disposed a bell-casing 16 which is filled with oil and which contains the converter 13 and the clutch 14.

Figure 2:
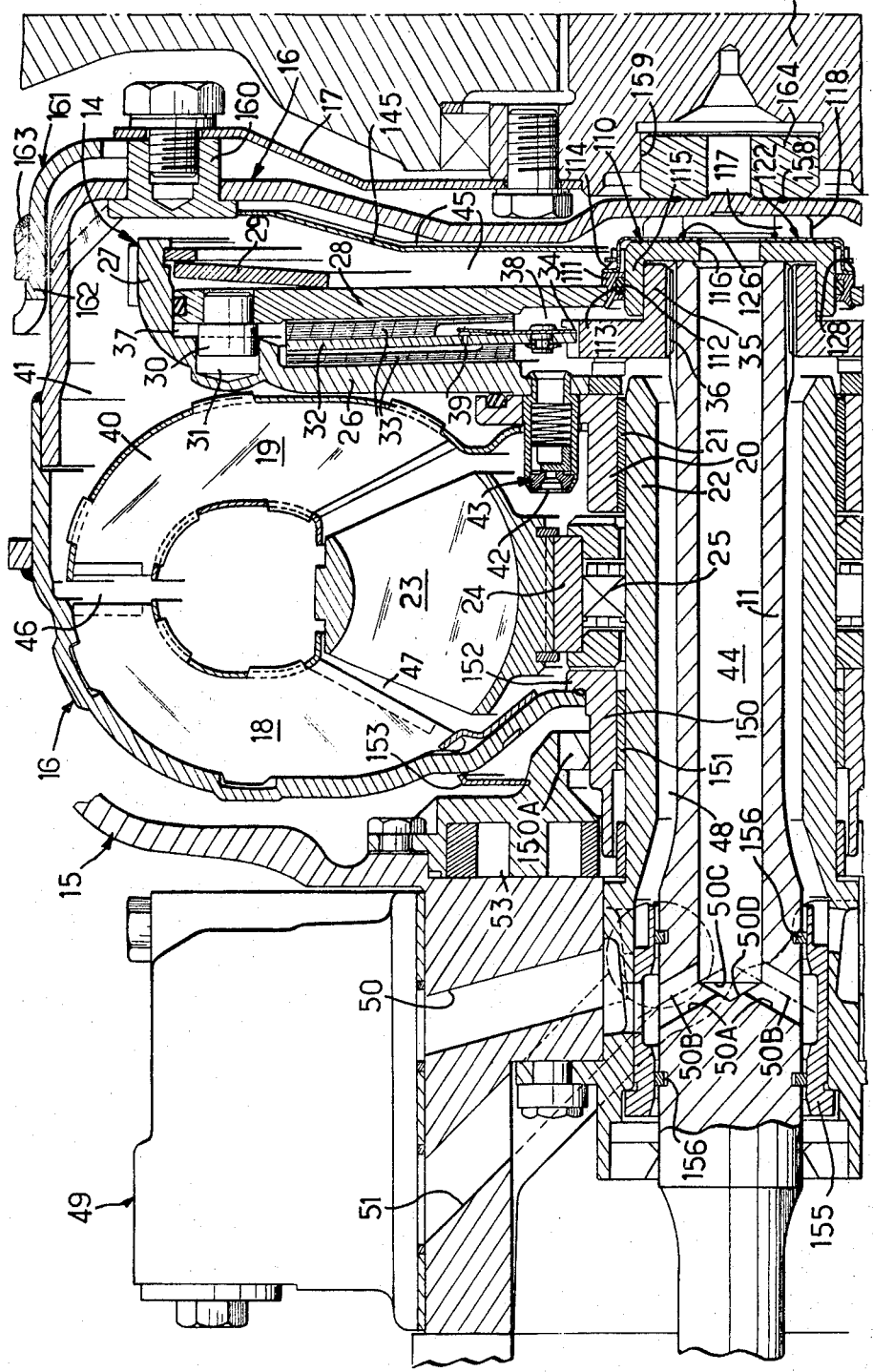
FIG. 2 is a view similar to FIG. 1 and shows on a larger scale, only a part of the transmission.

To the driving shaft 10 is coupled, by a flexible plate 17, the bell-casing 16, to which is rigidly connected the impeller 18 of the converter 13. The turbine 19 of the converter is rigid with a part 20 which turns on a bearing about a fixed sleeve 22 (FIG. 2). The latter is rigid with the housing 15 and surrounds the driven shaft 11. The reactor 23 of the converter is coupled to a part 24 which is prevented from turning in the sense opposite to the rotation of the engine by a unidirectional coupling, as for example a free wheel 25, with the sleeve 22.

The part 20 is rigidly secured by rivets (not shown) to the central portion of the plate 26 of the clutch 14. This clutch is adapted to couple or decouple the turbine 19 with the shaft 11.

In a peripheral cylindrical portion 27 of the plate 26 is engaged a plate in the form of a piston 28 urged towards the plate 26 by a simple Belleville washer 29.

The plate 28 is secured fast for rotation with the plate 26 by means of several studs 30 engaged in blind holes formed in the plate 26. This arrangement enables the plate 28 to be made in a hard material so that there is no permanent deformation of this plate.

A friction disc 32 having friction linings 33 on its two faces is disposed between the plates 26 and 28 and adapted to be gripped by them. It is mounted on splines 34 formed around a hub 35 itself mounted in splines on the shaft 11, which couples the disc 32 for rotation with this shaft.

Around the periphery of the clutch disc 32 and between the plates 26 and 28 of the clutch is formed a chamber 37 of variable volume containing oil, whist in the space surrounded by the linings 33 and lying between the plates 26 and 28 is a chamber 38 containing oil. The peripheral chamber 37 communicates with the chamber 38 by at least one suitable passage 39 provided, for example, in the disc 32 and the linings 33.

The bell-casing 16 filled with oil under pressure is thus divided into two chambers of which one is outside the plates 26 and 28 of the clutch 14 and includes the work circuit 40 of the converter 13, and a space 41 surrounding the plates 26 and 28 and disposed beside the converter 13. The other chamber is inside the plates 26 and 28 and is formed by the two chambers 37 and 38. The two chambers 40, 41 and 37, 38 communicate with each other only by means of calibrated orifices 42 which are arranged in the part 20 and provided with calibrated non-return valves 43 which permit circulation in the direction 40, 38, but prevent all circulation in the reverse direction.

The chamber 41 is fed with oil under pressure from a drilling 44 of the shaft 11 through a space 45 between the clutch 14 and the bell-casing 16, the passage running along either side of a plate 145 and of a collar 110 ensuring sealing between this space 45 and the internal volume 38 within the clutch plates 26, 28 in the manner to be described hereinafter. In its central zone, the plate 28 carries a separate ring which is held in place by being gripped between the collar 110 and the plate 28. This ring 111 has a groove 112 which houses a toroidal sealing joint 113, and also has radial notches 114.

The sealing collar 110, visible in detail in FIGS. 3 and 4 has, in the embodiment described, a cylindrical skirt 115 frictionally engaged between the hub 35 of the friction disc 32 and the ring 111. The collar 110 has an axial drilling 116 leading through diametric grooves 117 provided in an extension 118. For sealing between the passage 44 and the chamber 38, the shaft 11 bears against the collar 110 itself in contact with the wall of the bell-casing 16; the shaft 11 is urged against the collar by a spring 119, FIG. 1, disposed at the other end of the shaft 11 between a shoulder 120 of the latter and a further shoulder 121 of the shaft 12 in the end of which the shaft 11 is engaged. Communication between the passage 44 and the space 45 is ensured by the bore 116 and the transverse grooves 117 of the collar 110.

The collar 110 is prevented from turning with respect to the ring 111, so as to enable good sealing to be achieved, by a resilient open-ended rectangular member 122 whose base 123 is engaged in one of the transverse grooves 117 of the collar and has an opening 124 opposite to the bore 116 of the latter, the member 122 having two lateral arms 125 engaged in the radial notches 114 of the ring 111. The member 122 is held in contact with the bottom of the corresponding groove by a resilient retaining ring 126 housed in a groove formed for this purpose in the collar 110. Moreover, the member 122, of which the arms have turned-over portions 127 is encircled by a circlip 128 lodged in an annular recess formed in the ring 111.

This arrangement permits the ring 111 to slide without rotating on the collar 110, the ring 111 being rigid with the piston plate 28 and driven by the latter, whilst the collar 110 is allowed to rotate on the hub 35 whilst maintaining a seal; the retaining ring 126 prevents the rectangular member 122 from being displaced during the aforesaid sliding movement and the circlip 28 prevents spreading of the arms of the member 122 under the effect of centrifugal force.

The work circuit 40 of the converter 13 is fed with oil from the chamber 41 through the peripheral space 46 between the impeller 18 and turbine 19.

The oil leaves the work circuit 40 through the space 47 between the turbine 19 and reactor 23 and passes into the chamber 38 through the valves 43. This chamber 38 communicates with a space 48 between the shaft 11 and the sleeve 22.

The bore 44 is connected to distribution means 49 by a duct 50 and passages 50A. The space 48 is connected to the distribution means 49 by another duct 51. The distribution means 49 are fed with oil under pressure by a duct 52 which is connected to an oil pump 53 (FIGS. 1 and 2). The pump 53 is, in the example described, disposed adjacent to the impeller 18 and driven by the latter.

The intake 55 of the pump is connected to distribution means 49 which do not form part of the present invention and which will not be further described.

As long as the gearbox remains engaged and not in neutral, the output duct 52 of the pump 53 communicates with the duct 50. The oil under pressure flowing from the duct 52 into the duct 5 reaches the bore 44 (FIG. 2) and feeds the space 45, the space 41, the work circuit 40, after which it passes through the orifices 42 of the valves 43 being subjected to a considerable loss of force, and returns to the distribution means 49 via the following path: 38, 48, 51. As the pressure in the chamber 41 is greater than the pressure in the chambers 37, 38, by reason of the aforesaid loss of force, the clutch 14 remains engaged.

If a gear change is selected, or if the control lever is in neutral, the output duct 52 of the pump 53 is placed in communication with the duct 51. The oil under pressure in 52, 51 feeds the space 48 and the chamber 38, and then the chamber 37. The valves 43 close. The work circuit 40 and the chamber 41 are placed in communication with the intake 55 of the pump via the following path: 45, 44, 50, 83, 55. The pressure in the chambers 37, 38 is greater than the pressure in the chamber 41. The clutch 14 is disengaged.

There will be described hereafter various complementary arrangements included in the transmission shown.

As shown in FIG. 2, the bell-casing 16 is connected in its central zone on the impeller side, in the vicinity of the sleeve 22, to an outer sleeve 150 which surrounds the sleeve 22, the two sleeves being separated by a spacer 151, and which at one end has a transverse flange 152 enabling it to be welded to the bell-casing 16.

As shown in FIGS. 1 and 2 it is possible to secure to the pump body 53 a transverse deflector 153 which prevents possible impurities from entering the space 154 in the neighbourhood of the outer sleeve 150, and particularly in the region of the sealing joint 150A which, in the usual manner, is disposed between the sleeve 150 and the pump body 53. This arrangement is also very useful when the converter or coupler has its wall 16 cooled by a flow of air which may have foreign bodies entrained therein.

In a particular arrangement, the driven shaft, which is centred at each of its ends, is only separated from the fixed sleeve 22 by a simple bush 155, of steel for example, cooperating with sealing segments 156. This bush 155 can be rigid with the sleeve 22.

In another construction, the bell-casing 16 is centred on the driving shaft 10 by a stud 164 secured to the bell-casing 16 by a ring of welding 158 disposed within the perimeter of the corresponding contact surface, the said stud 164 being lodged in a housing 159 provided in the end of the shaft 10 (FIG. 2).

In a further arrangement, the diaphragm 17 which connects the bell-casing 16 to the driving shaft 10 is fixed to studs 160 set into the bell-casing 16, a ring 161 being rivetted on the diaphragm and having a cylindrical skirt 162 engaged around the bell-casing 16, on which skirt is fixed the usual starter ring 163 (FIGS. 1 and 2). This arrangement enables the axial bulk of the assembly to be reduced.

There will now be described with reference to FIG. 5, another embodiment of the invention incorporating an additional improvement.

In the embodiment shown in FIG. 5, which concerns, by way of example, an application of the invention to a hydrokinetic transmission in an automobile vehicle, there will be seen a hydrokinetic coupling device 210 such as a torque converter or coupler (a torque converter in the example shown) comprising: an impeller rigidly connected to a bell-casing 212 filled with oil and arranged to be driven by a shaft 213; a turbine 214 arranged to be rotatably driven by the impeller 211 under the action of the oil, which tends, at the same time to drive apart the impeller and turbine; and a reactor 215 connected to a fixed sleeve 216 by a free wheel 217.

A clutch 218 located, as is the converter 210, within the bell-casing 212 has two clutch plates 219 and 220 disposed in piston-cylinder relationship as in the foregoing embodiment. The cylinder plate 219 and the turbine 214 are rigid with a part 221. The piston plate 220 is rotatably connected to the plate 219 and is axially displaceable with respect to it, by axial engagement of projections 223 of the plate 220 in blind recesses 224 of the plate 219.

A friction disc 225 is disposed between the plates 219 and 220 and adapted to be gripped by the latter. The disc 225 is coupled to a hub 226 mounted on a driving shaft 227. A bush 222 is interposed between the part 221 and the hub 226.

The disc 225 is provided on both sides with annular friction linings of which the outer faces are arranged with advantage so that in the free state of the disc they are not parallel to the opposite faces of the clutch plates, and of which the outer diameter is less than the diameter of the plates 219 and 220. The bell-casing defines around the clutch plates an outer chamber 229, while an inner chamber, also filled with oil, extends between the plates 219 and 220 and is divided into two regions 230 and 231. The region 230 is surrounded by the linings 228 whilst the region 231 surrounds the linings 228. The two regions 230 and 231 of the inner chamber communicate by means of controlled passages 232 formed in the disc assembly 225.

As before, the clutch 218 is controlled in engagement by placing under pressure the outer chamber 229 and by allowing the inner chamber 230, 231 to discharge, this hydraulic action being reinforced by the action of a resilient Belleville washer 233 interposed between the plates 219 and 220. Declutching is effected by placing under pressure the inner chamber 230, 231 and allowing the outer chamber 229 to discharge.

As can be seen from FIG. 5 the central portion of the piston plate 220 surrounds in sealed manner a bearing bush 234 of a sealing collar 235 which is axially interposed between the hub 226 and the bell-casing 212.

In operation, the action of the oil which in the converter 210 enables the impeller 211 to drive the turbine 214 in rotation, tends at the same time to urge apart the impeller and turbine, that is to say it tends to push 214, 219, 221, 222 towards the right in FIG. 5 with respect to the assembly 211, 212. The turbine 214 can thus be displaced from the impeller 211 by an amount of play provided during assembly as far as a normal operating position in which the ring 222 of the part 221 axially abuts the hub 226 at 236, the hub itself axially abutting the collar 235 at 237, which latter axially abuts the bell-casing 212 at 238.

The hub 236 is thus gripped between the abutment surfaces 236 and 237, and this is not in any way troublesome during the phases in which the clutch is engaged since the assembly 214, 221, 222, 219, 220, 235, 225 and 226 are turning in unison. By contrast, however, it can result during declutching in unwanted friction at 236 and 237 on the hub 226 of the disc 225, preventing the latter from being completely free and introducing a drag which prevents its proper operation.

By the invention, this drawback is eliminated by means of axial abutment means interposed between the plate 220 and a flange 240 of the collar 235. These axial abutment means comprise a ring 239 carried by the plate 220, there being between the ring 239 and the flange 240 in the engaged position of the clutch, a conventionally chosen axial gap V.

If the declutching movement of the clutch plates 219 and 220 is designated by C and the play provided during assembly between the impeller 211 and turbine 214 by J, the space V is chosen so as to be less than C but greater than $C-J$.

In this way, the abutment means 239 having the space V, frees the hub 226 at the moment of declutching and enables the plates to move apart through their full declutching movement C. It will be observed that by virtue of the invention, the declutching movement is divided into two portions: the first is a movement of the plate 220 towards the right until the play V is taken up, and the second part is a movement of the plate 219 towards the left in FIG. 5 by a distance inferior to J.

With a view to reducing friction, the collar 235 can with advantage be made from a synthetic material such as "Teflon." It is driven by the seal carried by the ring 239, the internal diameter of which is 0.3 to 0.4 mm. smaller than the outer diameter of the collar 235, and thus has a certain gripping effect on the latter. When the piston plate is wide enough, the ring 239 can be omitted and the corresponding sealing joint carried by the piston plate 220.

It will be noticed moreover that the hub bearing 226 in the collar 235 is amply lubricated by means of longitudinal grooves provided either in the collar or in the hub. Again, in order to balance the pressure at either side of the hub 226, radial channels are provided at the end of the hub 226, either in the hub or in the collar 235.

What I claim is:

1. A hydraulic transmission comprising a rotatable bell-casing filled with oil, and connected to a driving shaft for rotation therewith, a hydraulic coupling device having an impeller fixed to the bell-casing, a turbine adapted to be driven in rotation by the impeller under the action of the oil, and two clutch plates in piston/cylinder relationship coupled for rotation with the turbine and adapted to grip or release a friction disc coupled for rotation with a driven shaft, the bell-casing being divided into two oil chambers of which one is outside and the other within the two plates, in combination with a source of oil under pressure, circulation ducts for the oil, and distribution means sensitive to the operating conditions of a gearbox and selectively directing the oil under pressure, towards one or the other of the chambers for engaging or disengaging the clutch, characterized in that elastic means are provided and that the driven shaft, having an axial passage forming part of one of the ducts, and being fast for rotation with and axially free, at one of its ends, from the input shaft of a gearbox, and at its other end from a carrying hub of the frition disc, is urged, at its end adjacent the gearbox by said elastic means which maintain it applied in sealed manner against a sealing collar bearing on the transverse wall of the bell-casing, the collar having at least one passage for communicating with the axial passage of the driven shaft and the oil chamber at the exterior of the clutch plates, and having also a cylindrical skirt inserted between the friction disc carrying hub, and an annular bearing rigid with the piston plate of the clutch in the central zone of the latter, sealing means being interposed between the annular bearing and the skirt.

2. A transmission according to claim 1 characterised in that the sealing collar is connected by positive driving means to the annular bearing.

3. A transmission according to claim 1 characterised in that the sealing collar is frictionally engaged in the annular bearing.

4. A transmission according to claim 1 characterised in that the annular bearing forms the internal bore of a ring carried by the piston plate of the clutch.

5. A transmission according to claim 1 characterised in that the internal passage of the sealing collar is formed by an axial duct combined with at least one transverse groove diametrically formed on the face of the collar which is in contact with the bell-casing.

6. A transmission according to claim 5 characterised in that an open ended rectangular member is provided for connecting the sealing collar in rotation with the associated annular bearing, the base of the member being inserted in one of the diametric grooves of the collar, and its arms being located in transverse notches formed in the annular bearing, the rectangular member being resilient, its central zone, which has an opening opposite the axial bore of the sealing collar, being applied against the latter by a retaining ring sprung into a groove formed for this purpose in the collar.

7. A transmission according to claim 6 characterised in that an annular circlip is passed over the arms of the rectangular member, the circlip being attached for axial movement with the piston plate of the clutch, the arms having their free ends turned over parallel to the base of the rectangular member.

8. A transmission according to claim 1 characterised in that the cylinder plate of the clutch, fixed for rotation with the turbine, and the piston plate of the clutch being axially displaceable with respect to each other, this displacement constituting the declutching movement which causes the clutch disc to be released, and the turbine having a normal axial operating position which, under the action of the oil is displaced from the impeller by a distance determined during assembly, this normal operating position being defined by the axial abutment of the cylinder plate-turbine assembly against the bell-casing through the hub of the friction disc, axial abutment means are interposed between the piston plate and the bell-casing and have in the engaged position of the clutch an axial separating gap which is less than the declutching movement but greater than the said movement minus the play between the turbine and impeller.

9. A transmission according to claim 8 characterised in that the means for axial abutment against the piston plate is formed on the sealing collar.

10. A transmission according to claim 9 characterised in that the axial abutment means is in the form of a flange on the sealing collar.

11. A transmission according to claim 1 characterised in that the driven shaft being centered at its two ends and surrounded by a fixed sleeve, a simple ring carrying sealing segments is interposed between the sleeve and the driven shaft.

12. A transmission according to claim 11 characterised in that the said ring is integral with the sleeve.

References Cited

UNITED STATES PATENTS 3,235,043  2/1966  Maurice et al. _____ 192—3.33
3,253,684  5/1966  Maurice _____ 192—3.3

BENJAMIN W. WYCHE III, *Primary Examiner.*

U.S. Cl. X.R.

192—91